(12) United States Patent
Lyu et al.

(10) Patent No.: US 12,519,596 B2
(45) Date of Patent: Jan. 6, 2026

(54) METHOD AND APPARATUS FOR DETERMINING A TIME LENGTH RELATED TO DEMODULATION REFERENCE SIGNAL IN WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/987,826

(22) Filed: Dec. 19, 2024

(65) Prior Publication Data

US 2025/0119259 A1    Apr. 10, 2025

Related U.S. Application Data

(63) Continuation of application No. PCT/CN2023/095833, filed on May 23, 2023.

(51) Int. Cl.
*H04L 5/00* (2006.01)
*H04L 25/02* (2006.01)

(52) U.S. Cl.
CPC ............ *H04L 5/0051* (2013.01); *H04L 25/02* (2013.01)

(58) Field of Classification Search
CPC .............................. H04L 5/0051; H04L 25/02
See application file for complete search history.

(56) References Cited

U.S. PATENT DOCUMENTS

| | | | | |
|---|---|---|---|---|
| 2018/0167252 | A1* | 6/2018 | Wang | H04B 7/0669 |
| 2020/0052853 | A1* | 2/2020 | Qin | H04L 5/0094 |
| 2024/0073904 | A1* | 2/2024 | Kumar | H04L 1/0057 |
| 2024/0340827 | A1* | 10/2024 | Ahmadzadeh | H04W 56/0045 |
| 2024/0406033 | A1* | 12/2024 | Rusek | H04B 7/15528 |
| 2025/0024548 | A1* | 1/2025 | Zhao | H04L 5/0044 |

FOREIGN PATENT DOCUMENTS

| | | |
|---|---|---|
| CN | 115333899 A | 11/2022 |
| CN | 115843426 A | 3/2023 |
| CN | 115997357 A | 4/2023 |
| WO | WO 2022250432 A1 | 12/2022 |
| WO | WO 2023010459 A1 | 2/2023 |
| WO | WO 2023051723 A1 | 4/2023 |

OTHER PUBLICATIONS

3GPP TR 38.821 V1.1.0, "3rd Generation Partnership Project; Technical Specification Group Radio Access Network; Solutions for NR to support non-terrestrial networks (NTN) (Release 16)," Dec. 2019, 143 pages.

(Continued)

*Primary Examiner* — Harry H Kim
(74) *Attorney, Agent, or Firm* — Fish & Richardson P.C.

(57) ABSTRACT

The present application provides a method and an apparatus for wireless communication. The method includes: determining a first time domain window related to DMRS bundling used for estimation of an uplink channel, where a time length of the first time domain window is determined based on first information.

20 Claims, 2 Drawing Sheets

(56) References Cited

OTHER PUBLICATIONS

3GPP TS 38.101-1 V15.16.0, "3rd Generation Partnership Project; Technical Specification Group Radio Access Network; NR; User Equipment (UE) radio transmission and reception; Part 1: Range 1 Standalone (Release 15) The present," Dec. 2021, 199 pages.
Huawei et al., "Evaluation of DL synchronization and central frequency tracking for NTN," 3GPP TSG RAN WG1 Meeting #96bis, R1-1904001, Xi'an, China, Apr. 8-12, 2019, 5 pages.
InterDigital, Inc., "Joint channel estimation for PUSCH," 3GPP TSG RAN WG1 #106b-e, R1-2110154, e-Meeting, Oct. 11-19, 2021, 12 pages.
International Search Report and Written Opinion in International Appln. No. PCT/CN2023/095833, mailed on Feb. 5, 2024, 12 pages (with partial English translation).
InterDigital, Inc., "Joint channel estimation for PUSCH," 3GPP TSG RAN WG1 #104-bis-e, R1-2103009, e-Meeting, Apr. 12-20, 2021, 11 pages.
Office Action in Chinese Appln. No. 202380010143.8, mailed on Mar. 7, 2025, 19 pages (with English translation).

\* cited by examiner

METHOD AND APPARATUS FOR DETERMINING A TIME LENGTH RELATED TO DEMODULATION REFERENCE SIGNAL IN WIRELESS COMMUNICATION

CROSS-REFERENCE TO RELATED APPLICATIONS

The present application is a continuation of International Application No. PCT/CN2023/095833, filed on May 23, 2023, the disclosure of which is hereby incorporated by reference in its entirety.

TECHNICAL FIELD

The present application relates to the field of communications technologies, and more specifically, to a method and an apparatus for wireless communication.

BACKGROUND

Some communications systems (such as a non-terrestrial network (non terrestrial network, NTN) system) feature a relatively large propagation delay and high device mobility. In such communications systems, when a device performs joint channel estimation based on demodulation reference signal (demodulation reference signal, DMRS) bundling, phase continuity in a specified time domain window may not be ensured. For example, when a terminal device improves a gain of uplink transmission through antenna switching, antenna switching performed by the terminal device may affect phase continuity and/or power consistency during DMRS bundling.

SUMMARY

The present application provides a method and an apparatus for wireless communication. Various aspects of embodiments of the present application are described below.

According to a first aspect, a wireless communication method is provided, and the method includes: determining a first time domain window related to DMRS bundling used for estimation of an uplink channel, where a time length of the first time domain window is determined based on first information, and the first information includes one or more of following information: a first time interval at which a terminal device performs antenna switching; a time length of a nominal time domain window predefined/pre-configured by a network device; an event that causes phase discontinuity and power inconsistency; maximum duration during which the terminal device maintains phase continuity; duration of repetitions of the uplink channel; or duration of segment transmission of the uplink channel.

According to a second aspect, an apparatus for wireless communication is provided, where the apparatus is a terminal device or a network device, and the apparatus includes: a determining unit, determining a first time domain window related to DMRS bundling used for estimation of an uplink channel, where a time length of the first time domain window is determined based on first information, and the first information includes one or more of following information: a first time interval at which a terminal device performs antenna switching; a time length of a nominal time domain window predefined/pre-configured by a network device; an event that causes phase discontinuity and power inconsistency; maximum duration during which the terminal device maintains phase continuity; duration of repetitions of the uplink channel; or duration of segment transmission of the uplink channel.

According to a third aspect, a communication apparatus is provided and includes a memory and a processor, where the memory is configured to store a program, and the processor is configured to invoke the program in the memory to execute the method according to the first aspect.

According to a fourth aspect, an apparatus is provided, and the apparatus includes a processor configured to invoke a program from a memory to execute the method according to the first aspect.

According to a fifth aspect, a chip is provided, and the chip includes a processor and is configured to invoke a program from a memory to cause a device installed with the chip to execute the method according to the first aspect.

According to a sixth aspect, a computer-readable storage medium is provided, and the computer-readable storage medium stores a program that causes a computer to execute the method according to the first aspect.

According to a seventh aspect, a computer program product is provided, and the computer program product includes a program that causes a computer to execute the method according to the first aspect.

According to an eighth aspect, a computer program is provided, where the computer program causes a computer to execute the method according to the first aspect.

In embodiments of the present application, a terminal device or a network device may determine, based on first information, a time length of a first time domain window related to DMRS bundling. The first information may include a first time interval at which the terminal device performs antenna switching, so as to avoid that phase continuity and power consistency during DMRS bundling are disrupted by the antenna switching. It may be learned that determining the time length of the first time domain window based on a plurality of types of information may be beneficial to improving a gain of uplink channel estimation based on the DMRS bundling.

DETAILED DESCRIPTION OF THE EMBODIMENTS

The following describes the technical solutions in embodiments of the present application with reference to the accompanying drawings in embodiments of the present application. Apparently, the described embodiments are some rather than all of embodiments of the present application. All other embodiments obtained by a person of ordinary skill in the art based on embodiments of the present application without creative efforts shall fall within the protection scope of the present application.

Embodiments of the present application may be applied to various communications systems. For example, embodiments of the present application may be applied to a global system for mobile communications (global system of mobile communication, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an advanced long term evolution (advanced long term evolution, LTE-A) system, a new radio (new radio, NR) system, an evolution system of an NR system, an LTE-based access to unlicensed spectrum (LTE-based access to unlicensed spectrum, LTE-U) system, an NR-based access to unlicensed spectrum (NR-based access to unlicensed spectrum, NR-U) system, an NTN system, a universal mobile telecommunications system (universal mobile telecommunication system, UMTS), a wireless local area network (wireless local area networks, WLAN), wireless fidelity (wireless fidelity, WiFi), and a 5th generation (5th-generation, 5G) communications system. Embodiments of the present application may be further applied to another communications system, such as a future communications system. The future communications system may be, for example, a 6th generation (6th generation, 6G) mobile communications system, or a satellite communications system.

Conventional communications systems support a limited quantity of connections and are easy to implement. With the development of communications technologies, a communications system may support not only conventional cellular communication but also one or more other types of communication. For example, the communications system may support one or more types of the following communication: device-to-device (device-to-device, D2D) communication, machine-to-machine (machine-to-machine, M2M) communication, machine type communication (machine type communication, MTC), enhanced machine type communication (enhanced MTC, eMTC), vehicle-to-vehicle (vehicle-to-vehicle, V2V) communication, vehicle-to-everything (vehicle-to-everything, V2X) communication, and the like. The embodiments of the present application may also be applied to a communications system that supports the foregoing communication manners.

The communications system in embodiments of the present application may be applied to a carrier aggregation (carrier aggregation, CA) scenario, a dual connectivity (dual connectivity, DC) scenario, or a standalone (standalone, SA) networking scenario.

The communications system in embodiments of the present application may be applied to an unlicensed spectrum. The unlicensed spectrum may also be considered as a shared spectrum. Alternatively, the communications system in embodiments of the present application may be applied to a licensed spectrum. The licensed spectrum may also be considered as a dedicated spectrum.

Embodiments of the present application may be applied to a terrestrial network (terrestrial networks, TN) system, or may be applied to an NTN system. For example, the NTN system may include a 4G-based NTN system, an NR-based NTN system, an internet of things (internet of things, IoT)-based NTN system, and a narrow band-internet of things (narrow band internet of things, NB-IoT)-based NTN system.

The communications system may include one or more terminal devices. The terminal device in embodiments of the present application may also be referred to as user equipment (user equipment, UE), an access terminal, a subscriber unit, a subscriber station, a mobile site, a mobile station (mobile station, MS), a mobile terminal (mobile Terminal, MT), a remote station, a remote terminal, a mobile device, a user terminal, a terminal, a wireless communications device, a user agent, a user apparatus, or the like.

In some embodiments, the terminal device may be a station (STATION, ST) in a WLAN. In some embodiments, the terminal device may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device or any other processing device connected to a wireless modem, a vehicle-mounted device, a wearable device, a terminal device in a next generation communications system (such as an NR system) or a terminal device in a future evolved public land mobile network (public land mobile network, PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone (mobile phone), a tablet computer (Pad), a notebook computer, a palmtop computer, a mobile Internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, and a satellite.

In addition to the terminal device, the communications system may further include one or more network devices. The network device in embodiments of the present application may be a device for communicating with the terminal device. The network device may also be referred to as an access network device or a wireless access network device. The network device may be, for example, a base station. The network device in embodiments of the present application may be a radio access network (radio access network, RAN) node (or device) that connects the terminal device to a wireless network. The base station may broadly cover various names below, or may be replaced with the following names, such as a NodeB (NodeB), an evolved NodeB (evolved NodeB, eNB), a next generation NodeB (next generation NodeB, gNB), a relay station, an access point, a transmitting and receiving point (transmitting and receiving point, TRP), a transmitting point (transmitting point, TP), a master MeNB, a secondary SeNB, a multi-standard radio (MSR) node, a home base station, a network controller, an access node, a wireless node, an access point (access point, AP), a transmission node, a transceiver node, a baseband unit (base band unit, BBU), a remote radio unit (remote radio unit, RRU), an active antenna unit (active antenna unit, AAU), a remote radio head (remote radio head, RRH), a central unit (central unit, CU), a distributed unit (distributed unit, DU), and a positioning node. The base station may be a macro base station, a micro base station, a relay node, a donor node, or the like, or a combination thereof. Alternatively, the base station may be a communications module, a modem, or a chip disposed in the device or the apparatus described above. The base station may be alternatively a mobile switching center, a device that functions as a base station in D2D, V2X, and M2M communication, a network-side device in a 6G network, a device that functions as a base station in a future communications system, or the like. The base station may support networks of a same access technology or different access technologies. A specific technology and a specific device form used by the network device are not limited in embodiments of the present application.

The base station may be stationary, or may be mobile. For example, a helicopter or an unmanned aerial vehicle may be configured to function as a mobile base station, and one or more cells may move depending on a location of the mobile base station. In other examples, a helicopter or an unmanned aerial vehicle may be configured to function as a device in communication with another base station.

In some deployments, the network device in embodiments of the present application may be a CU or a DU, or the network device includes a CU and a DU. The gNB may further include an AAU.

As an example rather than limitation, in embodiments of the present application, the network device may have a mobile feature, for example, the network device may be a movable device. In some embodiments of the present application, the network device may be a satellite or a balloon station. In some embodiments of the present application, the network device may alternatively be a base station arranged on land, water, or the like.

In embodiments of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell (small cell). The small cell herein may include: a metro cell (metro cell), a micro cell (micro cell), a pico cell (pico cell), a femto cell (femto cell), or the like. These small cells have a small coverage range and low transmit power, and are suitable for providing a high-rate data transmission service.

Figure 1:
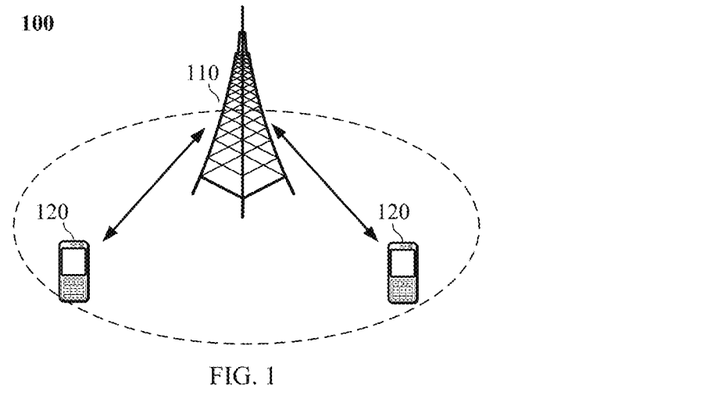
FIG. 1 shows a wireless communications system to which an embodiment of the present application is applied.

For example, FIG. 1 is a schematic diagram of an architecture of a communications system according to an embodiment of the present application. As shown in FIG. 1, a communications system 100 may include a network device 110, and the network device 110 may be a device that communicates with a terminal device 120 (or referred to as a communications terminal or a terminal). The network device 110 may provide communication coverage for a specific geographic region, and may communicate with a terminal device within the coverage.

FIG. 1 illustrates one network device and two terminal devices. In some embodiments of the present application, the communications system 100 may include a plurality of network devices, and another quantity of terminal devices may be included within a coverage of each network device. This is not limited in embodiments of the present application.

Figure 2:
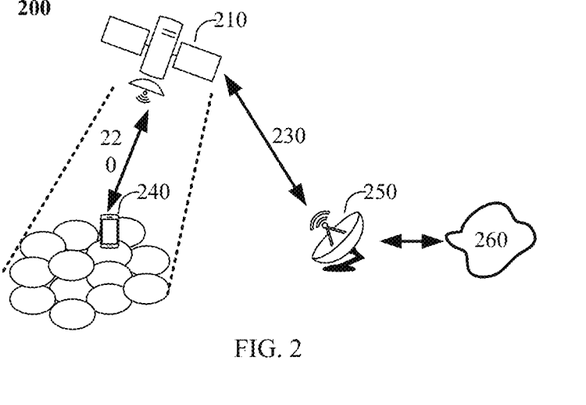
FIG. 2 shows an NTN system to which an embodiment of the present application is applied.
Figure 3:
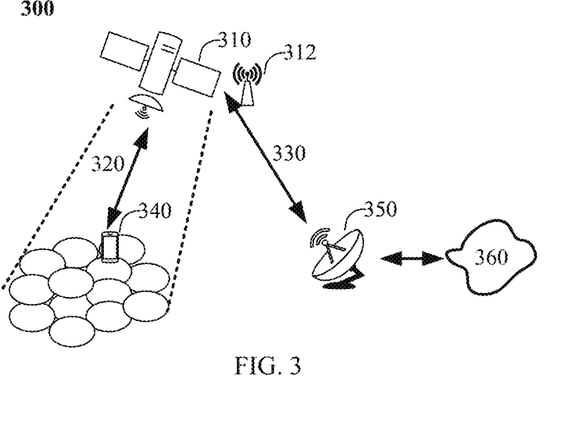
FIG. 3 shows another NTN system to which an embodiment of the present application is applied.

For example, FIG. 2 and FIG. 3 are schematic diagrams of two architectures of the NTN system described above. The NTN system 200 shown in FIG. 2 uses a satellite 210 as an air platform. As shown in FIG. 2, a satellite radio access network corresponding to the NTN system 200 includes a satellite 210, a service link 220, a feeder link 230, a terminal device 240, a gateway (gateway, GW) 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The Earth-based gateway 250 connects the satellite 210 to a base station or a core network, depending on the architecture.

The NTN architecture shown in FIG. 2 is a bent pipe transponder architecture. In this architecture, the base station is located on the Earth behind the gateway 250, and the satellite 210 serves as a relay. The satellite 210 functions as a repeater for forwarding signals of the feeder link 230 to the service link 220, or forwarding signals of the service link 220 to the feeder link 230. In other words, the satellite 210 does not have a function of a base station, and communication between the terminal device 240 and the base station in the network 260 needs to be implemented by using the satellite 210.

The NTN system 300 shown in FIG. 3 also uses a satellite 310 as an air platform, and the air platform carries a base station 312. As shown in FIG. 3, a satellite radio access network corresponding to the NTN system 300 includes the satellite 310, a service link 320, a feeder link 330, a terminal device 340, a gateway 350, and a network 360. FIG. 3 differs from FIG. 2 in that a base station 312 is provided on the satellite 310, and the network 360 behind the gateway 350 includes only a core network.

The NTN architecture shown in FIG. 3 is a regenerative transponder architecture. In this architecture, the satellite 310 carries the base station 312, and may be directly connected to an Earth-based core network by using a link. The satellite 310 has a function of a base station, and a terminal device 340 may directly communicate with the satellite 310. Therefore, the satellite 310 may be referred to as a network device.

The communications systems in the architectures shown in FIG. 2 and FIG. 3 may include a plurality of network devices, and another quantity of terminal devices may be included in coverage of each network device. This is not limited in embodiments of the present application.

In embodiments of the present application, the wireless communications system shown in FIG. 1 to FIG. 3 may further include another network entity such as a mobility management entity (mobility management entity, MME) or an access and mobility management function (access and mobility management function, AMF). This is not limited in embodiments of the present application.

It should be understood that a device having a communication function in a network/system in embodiments of the present application may be referred to as a communications device. The communications system 100 shown in FIG. 1 is used as an example. A communications device may include a network device 110 and a terminal device 120 having a communication function, and the network device 110 and the terminal device 120 may be specific devices described above. Details are not described herein again. The communications device may further include other devices in the communications system 100, such as a network controller, a mobility management entity, and other network entities. This is not limited in embodiments of the present application.

For ease of understanding, some related technical knowledge related to embodiments of the present application is first introduced. The following related technologies, as optional solutions, may be randomly combined with the technical solutions of embodiments of the present application, all of which fall within the protection scope of embodiments of the present application. Embodiments of the present application include at least part of the following content.

In R17, joint channel estimation across a plurality of consecutive slots is introduced for coverage enhancement. In joint channel estimation, DMRSs in a plurality of consecutive slots may be jointly used to perform channel estimation, so as to improve accuracy of channel estimation, thereby effectively improving corresponding channel coverage performance. For example, a state of a channel between a terminal device at an edge of a cell and a network device is often poor and a signal to interference plus noise ratio on a terminal device side is relatively low. The network device may improve accuracy of uplink channel estimation and demodulation performance of received signals by using joint channel estimation, thereby increasing corresponding channel coverage.

In the joint channel estimation, the network device instructs, by configuring related signalling, the terminal device to perform DMRS bundling in an uplink transmission process. The DMRS bundling may also be referred to as DMRS binding. A main limitation of the DMRS bundling lies in requirements for maintaining power consistency and phase continuity. In other words, the joint channel estimation introduced in R17 is based on a condition of maintaining power consistency and phase continuity.

The phase continuity is used as an example. A related specification defines a phase continuity requirement to be met in DMRS bundling duration. For example, in requirements of the technical specification TS 38.101-1[3], for a frequency division duplexing (frequency division duplexing, FDD) band and a DMRS bundling configuration supporting 16 slots, a maximum allowed phase difference between a slot 0 and any slot "p" in which DMRS bundling is applied is only 30 degrees. For another example, for an FDD band and a DMRS bundling configuration that supports 8 or less slots, a maximum allowed phase difference between any two consecutive slots (for example, slots "p-1" and "p") in which DMRS bundling is applied cannot exceed 25 degrees.

To specify duration of channel bundling, a configured time domain window (configured time domain window, C-TDW) and an actual time domain window (actual time domain window, A-TDW) are introduced into the joint channel estimation. The C-TDW may also be referred as a nominal TDW. Generally, duration of a TDW may be represented by a quantity of consecutive slots. Except for the last C-TDW, duration of each C-TDW may be configured by a higher layer.

A C-TDW is generally formed by one or more A-TDWs. The terminal device may determine an A-TDW for DMRS bundling according to a specific principle based on a C-TDW configured by a base station. For example, the first A-TDW starts at the first symbol of channel transmission and ends before an "event" occurs. The "event" is an event that may cause power consistency or phase continuity to be disrupted. For example, the terminal device is allowed to update common timing advance (timing advance, TA) and terminal device-specific TA or occurrence of an "event" between A-TDWs in each DMRS bundling window. A-TDW update is defined as an event that causes power consistency and phase continuity not to be maintained. When an event occurs, the terminal device may determine whether to start a new A-TDW based on a configuration, an event type, and a capability of the terminal device. The A-TDW also ends when channel transmission ends.

Transmission of a physical uplink shared channel (physical uplink shared channel, PUSCH) is used as an example. The terminal device may define a C-TDW and an A-TDW when performing PUSCH transmission. The C-TDW includes one or more consecutive slots, and one or more C-TDWs together support all repetitions of PUSCH transmission in time domain. Further, within each C-TDW, one or more A-TDWs may be implicitly determined, and the A-TDWs determine PUSCH transmission for which joint channel estimation may actually be performed. During the PUSCH transmission, TA or "event" usually occurs in an A-TDW interval during DMRS bundling. In other words, the network device expects the terminal device to maintain power consistency and phase continuity within each A-TDW.

For ease of understanding, a detailed description is made below with reference to FIG. 4 by using, as an example, a DMRS bundling time domain window corresponding to a repetition of PUSCH transmission.

Figure 4:
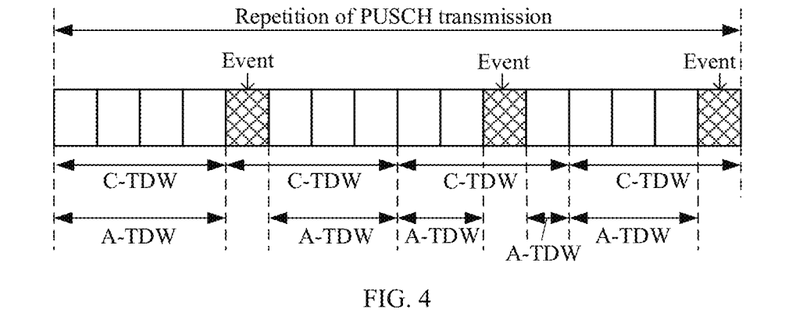
FIG. 4 is a schematic diagram of a time domain window corresponding to DMRS bundling to which an embodiment of the present application is applied.

Reference is made to FIG. 4. The DMRS bundling time domain window includes 16 slots. A number of repetitions of PUSCH transmission is 16, and a length of a C-TDW is configured as four slots. In other words, all repetitions of PUSCH transmission are supported by four C-TDWs within the time domain window.

Reference is still made to FIG. 4. A start slot and an end slot of an A-TDW are both related to a C-TDW and an event. As shown in FIG. 4, the A-TDW does not support a repetition of transmission corresponding to an event. A start slot of an A-TDW may be a start slot of each C-TDW, or may be a next slot of an event. An end slot of an A-TDW may be an end slot of each C-TDW, or may be a slot before an event occurs. Therefore, in one C-TDW, an A-TDW is generated only when an event ends.

DMRS bundling for joint channel estimation is described above with reference to FIG. 4. A current DMRS bundling standard is specified based on a TN system. Because round-trip delay variation in the TN system is very small, a phase may maintain continuity required by the specifications when a terminal device does not perform autonomous TA adjustment in an A-TDW. However, for a communications system having high mobility such as the NTN mentioned above, due to network characteristics such as large propagation delay and device mobility, it cannot be ensured that a phase continuity requirement based on DMRS bundling in the above specifications is met. For example, since a satellite moves very fast, a round-trip delay is changed significantly, which may cause phase discontinuity and time asynchronization.

In some communications systems (such as an NR system), a network device may alternatively obtain downlink channel information by using channel reciprocity. For example, the network device may determine downlink channel information by measuring a sounding reference signal (sounding reference signal, SRS). For example, a base station side may acquire downlink channel information by measuring an SRS by using channel reciprocity.

The channel reciprocity may also be referred to as coherent (coherent) reciprocity. Channel fading experienced by an uplink (uplink, UL) channel is substantially the same as that experienced by a downlink channel over a coherent time. An existing requirement for coherent multiple-input multiple-output (multiple-input multiple-output, MIMO) is based on a time window of 20 ms. A common requirement for a related UL-MIMO is a maximum allowable difference of measured relative power and phase errors between different antenna ports within a specified time window of 20 ms from the last transmitted SRS on a same antenna port. Therefore, the time window is required to support a measurement window size of the maximum allowable difference of the relative power and phase errors. In an NTN system, there is a relatively large round trip time (round trip time, RTT) delay, namely, a round trip delay (round trip delay, RTD), between a terminal device and a satellite. The time window needs to be extended to accommodate a larger RTD, so as to ensure availability of precoding transmitted by a network device. In other words, in a system with a relatively large RTT delay, to ensure availability of precoding, a coherent time window is to be extended to accommodate a large RTD of the NTN system.

In an NR system, 64 SRS bandwidth configuration manners are supported. A minimum bandwidth that may be configured for one SRS resource is 4 resource blocks (resource block, RB), and a maximum bandwidth that may be configured for one SRS resource is 272 RBs. One SRS resource may include one, two, or four antenna ports, and is configured by a network device according to a capability of a terminal device.

NR also supports four types of SRSs with different functions. SRSs with different functions are managed and configured in a manner of an SRS resource set. In some scenarios, for different SRS uses, the network device may configure different SRS resource sets for the terminal device. The network device may further indicate a use of an SRS resource set by using higher layer signalling. For example, the SRS resource set may be used for antenna switching (antenna switching). For example, a network device may configure a plurality of SRS resource sets for a UE, and a function of each resource set is configured by using higher layer signalling.

Antenna switching may support uplink and downlink channels of terminal devices with different antenna receive and transmit capabilities by using channel reciprocity. Due to a limitation of costs and hardware, a quantity of antennas for simultaneous transmission of a terminal device may be less than a quantity of receive antennas, so that different terminal devices have different antenna transmitting and receiving capabilities. A quantity of transmit antennas of a terminal device is less than or equal to a quantity of transmit antennas of a network device. For example, the antenna transmitting and receiving capabilities of a terminal device may include: a quantity of transmit antennas is the same as a quantity of receive antennas (that is, T=R), a quantity of transmit antennas is 1 and a quantity of receive antennas is 2 (namely, 1T2R), a quantity of transmit antennas is 1 and a quantity of receive antennas is 4 (namely, 1T4R), and a quantity of transmit antennas is 2 and a quantity of receive antennas is 4 (namely, 2T4R).

For a terminal device whose quantity of transmit antennas is less than a quantity of receive antennas, to enable the network device to obtain complete downlink channel state information, an SRS may be transmitted by using different antennas at different times through antenna switching. In other words, to allow the terminal device whose quantity of transmit antennas is less than a quantity of receive antennas to provide downlink channel information to the network device by using channel reciprocity, the NR system supports the terminal device to transmit an SRS in an antenna switching manner. Further, when the terminal device uses channel reciprocity through antenna switching, a gain of channel estimation performed based on DMRS bundling may also be improved.

In some embodiments, the terminal device may transmit the SRS based on configuration information of SRS antenna switching. The configuration information of the SRS antenna switching includes at least one of the following: information about a quantity of transmit antennas and a quantity of receive antennas, information about an SRS resource set, information about an SRS resource, information about an SRS port, or information about a quantity of transmission layers.

The foregoing describes a manner in which a terminal device transmits an SRS based on antenna switching. For an NTN system, the terminal device may improve a gain of uplink transmission and channel estimation in a spatial diversity manner such as antenna switching. For example, the NTN system may support antenna switching performed in a case in which signal quality corresponding to a current antenna is relatively poor, so as to improve the gain of uplink transmission. For another example, the NTN system may support SRS antenna switching of the terminal device, that is, the terminal device transmits an SRS by using different antennas at different times according to a predefined rule, so that the network device obtains complete downlink channel state information. For another example, the NTN system may support antenna switching performed by terminal device during transmission of a DMRS bundling-based PUSCH, so as to improve a gain of channel estimation performed after DMRS channels are bundled.

However, in the NTN system, in a case that channel estimation is performed based on DMRS bundling, antenna switching of the terminal device may affect phase continuity and/or power consistency during DMRS bundling.

The foregoing describes effect of antenna switching performed by the terminal device on joint channel estimation based on DMRS bundling in the NTN system. There are several problems that may affect channel estimation in the NTN system. For example, in the NTN system, a capability of the terminal device to maintain phase continuity is affected by problems such as a relatively large propagation delay and high mobility. For another example, duration of uplink channel segment transmission in the NTN system is also affected.

It should be noted that the foregoing problem that at least one of phase continuity or power consistency during DMRS bundling is affected due to relatively large propagation delay and high device mobility in the NTN system is merely an example. Embodiments of the present application may be applied to any type of communication scenarios in which a communications system with a large propagation delay and high device mobility performs channel estimation based on the DMRS bundling.

To solve the foregoing problem, an embodiment of the present application provides a method for wireless communication. According to this method, a terminal device or a network device may determine, based on a plurality of types of information such as a first time interval for antenna switching, a time length of a first time domain window corresponding to DMRS bundling, so as to improve a gain of uplink channel estimation based on the DMRS bundling. The following describes a method embodiment in embodiments of the present application in detail with reference to FIG. 5. For ease of understanding, the following describes in detail the method provided in embodiments of the present application with reference to FIG. 5.

Figure 5:
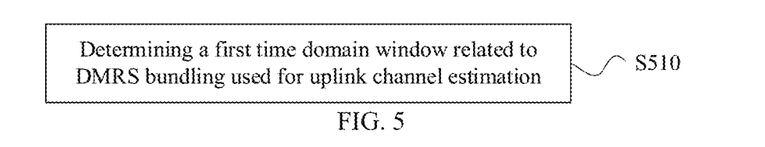
FIG. 5 is a schematic flowchart of a method for wireless communication according to an embodiment of the present application.

Referring to FIG. 5, in step S510, a first time domain window related to DMRS bundling used for uplink channel estimation is determined.

A communications device for determining the first time domain window may be any one of the terminal devices described above, or may be any one of the network devices described above, which is not limited herein.

The terminal device may be a terminal device that communicates with any network device. In some embodiments, the terminal device may be a device that communicates with an air platform via a service link in an NTN system, or may be a gateway that communicates with the air platform via a feeder link. The air platform is, for example, a satellite, or a UAV system.

In some embodiments, the terminal device may be a communications device with different capabilities. For example, the terminal device may be a device that meets a R18 capability requirement. For example, the terminal device may have a capability to support antenna switching. For example, when a quantity of transmit antennas of the terminal device is less than a quantity of receive antennas, the terminal device may perform uplink transmission on different antenna ports through antenna switching. For example, the terminal device may have different antenna receiving and transmitting capabilities.

A network device may be a communications device that provides a network service for any terminal device. In some embodiments, a network device communicating with the terminal device may be a base station carried by a satellite in the NTN system. In some embodiments, the network device may be a satellite with different orbital altitudes in the NTN system. For example, the network device may be a low-earth orbit (low earth orbit, LEO) satellite, a medium-earth orbit (medium earth orbit, MEO) satellite, a geostationary earth orbit (geostationary earth orbit, GEO) satellite, a high elliptical orbit (High Elliptical Orbit, HEO) satellite, or the like. When an orbital altitude of the LEO satellite is 1200 km, it may be represented by LEO-1200.

Wireless communication of different service types may be performed between the terminal device and the network device. The service type includes a voice over internet protocol (voice over internet protocol, VOIP) service based on IP. For example, the terminal device and the network device may transmit a VoIP data packet.

The terminal device or the network device determining the first time domain window indicates that the terminal device or the network device determines a first time domain window related to DMRS bundling. In other words, the first time domain window is a time domain window in which the terminal device transmits an uplink channel based on the DMRS bundling. The DMRS bundling is beneficial for a communications device to estimate an uplink channel. For example, when the terminal device determines the first time domain window related to the DMRS bundling, it may be convenient for the terminal device to transmit, in the first time domain window, the uplink channel for the network device to perform channel estimation. For another example, when determining the first time domain window related to the DMRS bundling, the network device may indicate, to the terminal device, a first time domain window for transmitting the uplink channel, and perform channel estimation based on the uplink channel corresponding to the time domain window. For another example, based on channel reciprocity, the network device indicates the first time domain window to the terminal device, so that the network device may easily acquire downlink channel information by using the uplink channel transmitted by the terminal device.

An uplink channel corresponding to the DMRS bundling may be a PUSCH transmitted by the terminal device, or may be a physical uplink control channel (physical uplink control channel, PUCCH), which is not limited herein.

The first time domain window being related to DMRS bundling for uplink channel estimation indicates that the first time domain window is a time domain window during DMRS bundling. The DMRS bundling is used for enhancing joint channel estimation in uplink coverage. The first time domain window may be an A-TDW during DMRS bundling, or may be a time domain window in which the terminal device transmits the uplink channel in segments during DMRS bundling.

In some embodiments, the first time domain window is an A-TDW related to the DMRS bundling. In a time period corresponding to the A-TDW, the terminal device may maintain phase continuity and/or power consistency. The terminal device or the network device may determine the first time domain window according to a continuity requirement of the A-TDW. The terminal device may allow a receiver to perform joint channel estimation across a plurality of slots by maintaining phase continuity and power consistency in A-TDW duration.

In a possible implementation, one or more A-TDWs may be included during the DMRS bundling. The A-TDW related to the DMRS bundling may be the one A-TDW, or may be any one of the plurality of A-TDWs.

In some embodiments, the first time domain window is a time period corresponding to segment transmission of an uplink channel. Specifically, when the terminal device performs segment transmission during the DMRS bundling, each time period for continuous transmission is the first time domain window.

In a possible implementation, one or more time periods for segment transmission may be included during the DMRS bundling. The segment transmission related to the DMRS bundling may be the one segment, or may be any segment in a plurality of segments.

The determining, by the terminal device or the network device, a first time domain window includes determining a time length of the first time domain window. The time length of the first time domain window may be determined based on first information. The first information may include one or more of the following information: a first time interval at which the terminal device performs antenna switching; a time length of a C-TDW predefined/pre-configured by the network device; an event that causes phase discontinuity and power inconsistency; maximum duration during which the terminal device maintains phase continuity; duration of repetitions of the uplink channel; or duration of segment transmission of the uplink channel.

In some embodiments, the first information for determining the time length of the first time domain window may include the foregoing two or more types of information. The multiple types of information may be mutually determined or include each other. For example, the time length of the C-TDW predefined/pre-configured by the network device may be used for determining the duration of segment transmission of the uplink channel. For another example, antenna switching performed by the terminal device may be one of a plurality of events that cause phase discontinuity and power inconsistency. Therefore, when the first time domain window is an A-TDW, a time length of the A-TDW may be determined based on the time length of the C-TDW and the first time interval for antenna switching.

In some embodiments, the first information includes the first time interval at which the terminal device performs antenna switching. In other words, the time length of the first time domain window is determined based on the first time interval. For example, when the first time domain window is the time period for segment transmission of the uplink channel, a boundary of each segment may be determined based on the first time interval. For example, when the first time domain window is an A-TDW, a boundary of the A-TDW may be determined based on the first time interval.

In a possible implementation, when the first information includes the first time interval, the first information may further include one or more types of information in the plurality of types of information. For example, when the first time domain window is an A-TDW, the time length of the first time domain window may be jointly determined based on the first time interval, the time length of the C-TDW, and an event that disrupts continuity.

The following uses the A-TDW as an example to specifically describe a method for determining the time length of the first time domain window based on the first time interval. It should be noted that when the first time domain window is another time period, the time length of the time period may also be determined with reference to the manner of determining the time length of the A-TDW, and details are not described again.

The A-TDW being determined based on the first time interval at which the terminal device performs antenna switching includes that the time length of the A-TDW may be determined based on a time interval at which the terminal device performs antenna switching. In other words, a size of the A-TDW may be determined based on the first time interval at which the terminal device performs antenna switching.

The terminal device or the network device determines, based on the time interval for antenna switching, the A-TDW corresponding to the DMRS bundling, which is beneficial to improving gain from channel estimation and uplink transmission performed by a communications device when antenna switching and the DMRS bundling are jointly performed. In some embodiments, when the terminal device enables antenna switching, antenna switching may occur a plurality of times during repetitions of transmission of an uplink channel (for example, a PUSCH). Phase continuity of uplink transmission will be interrupted at an antenna switching point, and thus antenna switching will limit a length of the A-TDW. In other words, antenna switching cannot be performed during the DMRS bundling. Otherwise, phase continuity and power consistency cannot be ensured within DMRS bundling.

In some embodiments, in order to efficiently implement spatial diversity through antenna switching in the NTN system, antenna switching may be performed at a boundary of two bundled windows for UL transmissions with DMRS bundling. The boundary is related to the first time interval. For example, when the DMRS bundling corresponds to one A-TDW, antenna switching may be performed at a boundary time of the A-TDW.

It may be learned from the foregoing description that when a quantity of transmit antennas of the terminal device is less than a quantity of receive antennas, the terminal device may transmit uplink data on different antenna ports through antenna switching. In a possible implementation, when signal quality of an antenna port does not meet a requirement, the terminal device may ensure uplink coverage performance through antenna switching. In other words, timing of antenna switching may be related to signal quality corresponding to a transmit antenna.

In a possible implementation, the timing of antenna switching may be determined by signal quality corresponding to an antenna that currently transmits an uplink channel. In other words, when the antenna that currently transmits the uplink channel is a first antenna, signal quality corresponding to the first antenna may be used for determining the timing of antenna switching. For example, when the signal quality corresponding to the first antenna meets a requirement, the terminal device may not perform antenna switching. For another example, when the signal quality corresponding to the first antenna does not meet a requirement, the terminal device switches an antenna that transmits the uplink channel from the first antenna to a second antenna.

In a possible implementation, signal quality for determining timing of antenna switching may be represented by a signal to noise ratio (signal noise ratio, SNR), or may be represented by reference signal received power (reference signal received power, RSRP), or may be represented by reference signal received quality (reference signal received quality, RSRQ).

In another possible implementation, whether signal quality meets a requirement may be determined by using a specified threshold. For example, if the signal quality is greater than or equal to a first threshold, the terminal device may not perform antenna switching. In contrast, if the signal quality corresponding to the first antenna is less than the first threshold, the terminal device switches the antenna that transmits the uplink channel from the first antenna to the second antenna.

An SNR is used as an example, and the first threshold is set to $SNR_{target}$. If the signal quality of the first antenna meets $SNR_1 < SNR_{target}$, antenna switching is indicated. Similarly, if signal quality of the second antenna meets $SNR_2 < SNR_{target}$, antenna switching is indicated. After antenna switching is performed, signal quality averages $SNR_{av}$ corresponding to the first antenna and the second antenna meet the following condition:

$$SNR_{av} = 2^{CAP-1},$$

where $CAP=[\log_2(1+SNR_1)+\log_2(1+SNR_2)]/2$.

In some embodiments, the terminal device consumes a specific time for performing antenna port switching. Further, in a process of performing antenna port switching, the terminal device cannot transmit any uplink information. In a possible implementation, the terminal device may configure a guard period for antenna switching, so as to ensure implementation of an antenna port switching process. For example, the terminal device may prepare configuration related to antenna switching in the guard period.

In a possible implementation, the guard period for antenna switching may be represented by a time length, or may be represented by a quantity of time units. The time unit may be a slot, or may be a symbol, which is not limited herein. For example, the terminal device may configure a guard period K for antenna switching, and the guard period K may be set to 1, 2, 3, . . . , N symbol lengths. For example, a length of the guard period may be represented by using X milliseconds.

In some embodiments, a time at which the terminal device completes antenna switching may include the guard period, or may be only a time period at which the terminal device performs antenna switching. If the guard period is included, the time at which the terminal device completes antenna switching refers to a time period at which the terminal device performs antenna switching and a guard period before and after the antenna switching.

In some embodiments, the time at which the terminal device completes antenna switching may be represented by a time length, or may be represented by a quantity of time units. The time length may be a time period represented by a plurality of time units such as milliseconds. The time unit may be a slot, or may be a symbol, which is not limited herein. For example, the time at which the terminal device completes antenna switching may be represented by a quantity of slots. For different subcarrier spacings, a slot length may vary. For example, it is defined that a time length for an antenna to complete antenna switching is T1, and T1 includes a guard period for the antenna switching. A time T at which the terminal device completes antenna switching may further be represented as follows:

$$T = \gamma \left\lceil \frac{T1}{T\_slot} \right\rceil,$$

where $\lceil \ \rceil$ denotes a floor operation, $\gamma$ denotes a rational number of an adjustment factor, and T_slot denotes a time length of one slot. The foregoing formula indicates that T slots are required for the terminal device to complete switching.

In some embodiments, configuration information for the terminal device to perform antenna switching may be predefined or configured by a network device. For example, the network device may transmit the configuration information for antenna switching to the terminal device by using radio resource control (radio resource control, RRC) signalling, downlink control information (downlink control information, DCI), or medium access control (medium access control) signalling (for example, a MAC control element (control element, CE)).

The first time interval at which the terminal device performs antenna switching may be a time period determined based on two times of adjacent antenna switching. In some embodiments, the first time interval may refer to a time period from a time point at which the terminal device completes antenna switching for the $N^{th}$ time to a time point at which antenna switching is triggered for the $(N+1)^{th}$ time. In some embodiments, the first time interval may refer to a time period from a time point at which the terminal device completes antenna switching for the $N^{th}$ time to a time point at which antenna switching is completed for the $(N+1)^{th}$ time. In some embodiments, the first time interval may refer to a time period from a time point at which the terminal device triggers antenna switching for the $N^{th}$ time to a time point at which antenna switching is triggered for the $(N+1)^{th}$ time.

In some embodiments, the first time interval at which the terminal device performs antenna switching may be related to the timing of antenna switching described above, or may be related to an antenna switching interval supported by the terminal device.

In a possible implementation, the first time interval at which the terminal device performs antenna switching may be determined based on the timing of antenna switching. For example, the terminal device may determine an end time point of the first time interval based on signal quality of an antenna port. For example, in a process of transmitting an uplink channel, if signal quality of an antenna port that transmits the uplink channel is lower than a specified threshold, the terminal device triggers antenna switching. It may be learned from the foregoing description that the end time point of the first time interval is a time point at which antenna switching is triggered.

In another possible implementation, the first time interval at which the terminal device performs antenna switching may be related to a length of an antenna switching interval supported by the terminal device. For example, the first time interval may be equal to the antenna switching interval supported by the terminal device in length, or may be less than the antenna switching interval supported by the terminal device in length.

For example, the antenna switching interval supported by the terminal device may be related to a capability of the terminal device, or may be related to a communication environment of the terminal device and the network device. For example, the terminal device may determine a length of a supported antenna switching interval based on a capability of maintaining phase continuity and power consistency.

In some embodiments, the first time interval at which the terminal device performs antenna switching may be determined independently by the terminal device. For example, the terminal device may determine the first time interval based on the length of the antenna switching interval supported by the terminal device. For another example, because a total budget of a single VoIP data packet is 20 ms, the terminal device may set the antenna switching interval to a specific time length. The time length is, for example, 1, 2, 4, 8, 10, or 12 ms.

An A-TDW is determined based on a first time interval at which the terminal device performs antenna switching, which means that the antenna switching performed by the terminal device may be used as an event that interrupts phase continuity and/or power consistency. Because the terminal device does not transmit uplink data when performing antenna switching, antenna switching may be used as a new event that interrupts phase continuity and/or power consistency. Therefore, antenna switching is to be used as one of factors for determining duration of the A-TDW. For DMRS bundling on which antenna switching is enabled, a corresponding A-TDW may be determined by using the first time interval at which the terminal device performs antenna switching, so as to ensure that phase continuity meets a requirement for continuity in a related technical specification (for example, Article 6.4.2.5 in TS 38.101-1). In this case, antenna switching of the terminal device and DMRS bundling for joint channel estimation are performed jointly during transmission of an uplink channel (for example, a PUSCH), thereby increasing channel estimation gain with more spatial diversity.

For example, to meet LEO-1200 PUSCH of VOIP, antenna switching should be considered in combination with DMRS bundling. A relatively small antenna switching interval may use more spatial diversity within a 20 ms VOIP transmission time budget, and a relatively large A-TDW may provide more channel estimation gains.

When the size of the first time domain window related to the DMRS bundling is determined based on the first time interval for antenna switching, a DMRS bundling mechanism and an antenna switching mechanism may be jointly executed in transmission of the uplink channel. When the DMRS bundling and antenna switching are jointly performed, the first time domain window is determined based on the first time interval, so that a spatial diversity gain based on antenna switching may be increased when a channel estimation gain based on the DMRS bundling is ensured.

The terminal device or the network device may determine an A-TDW based on the first time interval in a plurality of manners. For example, the terminal device may determine the A-TDW by exchanging information with the network device.

In some embodiments, the terminal device may transmit the first time interval to the network device. The network device may determine the A-TDW based on the first time interval. The network device may transmit configuration information of the A-TDW to the terminal device. The configuration information of the A-TDW may include a time length of the A-TDW, or may include a configuration parameter of the A-TDW.

For example, when the terminal device independently determines an antenna switching interval, the network device may not know the time interval at which the terminal device executes antenna switching. Therefore, the terminal device is required to report assistance information, and the assistance information may indicate the first time interval. For example, the terminal device may report an independently determined first time interval, so that the network device determines a size of an A-TDW used for DMRS bundling, thereby ensuring system uplink coverage performance. After determining the A-TDW based on the first time interval, the network device informs the terminal device of the A-TDW. For another example, the terminal device may report, to the network device, a length of an antenna switching interval supported by the terminal device, so that the network device determines a size of the A-TDW used for DMRS bundling. The network device may report the size of the A-TDW to be fed back to the terminal device by using RRC dedicated signalling or a capability of the terminal device.

Figure 6:
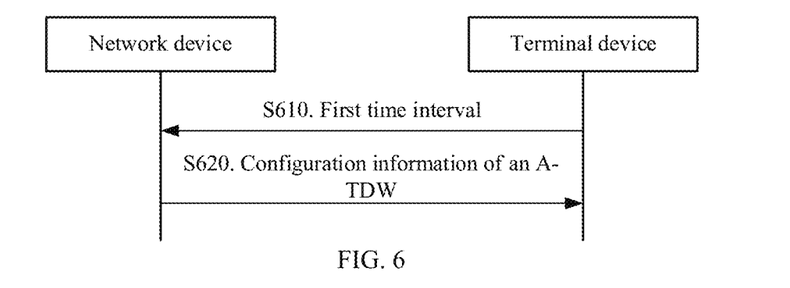
FIG. 6 is a schematic flowchart of a possible implementation of the method illustrated in FIG. 5.

For ease of understanding, the following describes a possible implementation in which a terminal device determines an A-TDW with reference to the schematic flowchart shown in FIG. 6. FIG. 6 shows interaction between a terminal device and a network device.

Referring to FIG. 6, in Step S610, the terminal device transmits a first time interval to the network device. In a case that the terminal device independently determines the first time interval, the network device does not determine the first time interval. The terminal device may transmit the first time interval to the network device, and the first time interval may be used by the network device to determine a size of an A-TDW.

In Step S620, the network device transmits configuration information of the A-TDW to the terminal device.

With reference to FIG. 5 and FIG. 6, the foregoing describes a method for determining, by a terminal device or a network device, a time length of a first time domain window based on a first time interval when first information includes the first time interval at which the terminal device performs antenna switching. It may be learned from the foregoing description that the first information may further include other types of information.

In some embodiments, the first information may include configuration information related to DMRS bundling. The configuration information related to DMRS bundling may be used for determining the time length of the first time domain window. For example, when the first time domain window is an A-TDW, the terminal device may determine the A-TDW based on the configuration information and the first time interval. Further, the terminal device may notify the network device of duration of the A-TDW by using dedicated signalling.

In a possible implementation, the configuration information related to the DMRS bundling may include a C-TDW related to the DMRS bundling. In other words, the first information may include a time length of a nominal time domain window predefined/preconfigured by the network device. The nominal time domain window is a C-TDW. The network device may set a size of the C-TDW. For example, the network device may configure the C-TDW based on a report of the terminal device. In this report, requirements for phase difference limitation, timing, and frequency error may be considered. The report also includes a capability of the terminal device. In other words, the size of the C-TDW may depend on the capability of the terminal device. For example, during repetitions of PUSCH transmission, a length of the C-TDW may be configured by using RRC signalling from the network device. For example, for a terminal device using a PUSCH-TimeDomainWindow-Length-r18 information element (information element, IE), the network device may perform configuration by using specific RRC signalling. According to the specific RRC signalling, the C-TDW may be configured as any value from 1 slot to 32 slots. For example, the C-TDW may be determined based on duration of segment transmission on an uplink channel, which will be described below with reference to a manner of determining the A-TDW.

For example, a time length of the C-TDW may be carried in one or more of the following information: a broadcast message, an RRC message, or DCI. Specifically, the network device may transmit the C-TDW by means of the broadcast message, the RRC message, the DCI, or a manner of combining a plurality of messages. The DCI may be used for transmitting the C-TDW by means of a dynamic indication.

For example, the C-TDW may be the same for all terminal devices, or may be different for different terminal devices.

For example, the network device may determine the C-TDW according to the service type. In other words, the C-TDW may be related to the service type that corresponds to the uplink channel. For example, the C-TDW may be determined based on quality of service (quality of service, QoS) of a service. Different services may have different C-TDW sizes. For example, for a VoIP service, a C-TDW may be set to not exceed 10 ms.

In a possible implementation, when the network device is a satellite in the NTN system, the configuration information related to the DMRS bundling may include a time domain window related to the DMRS bundling. The time domain window related to the DMRS may include a C-TDW, or may include an A-TDW determined by the satellite. In this case, a time length of the time domain window may be determined based on one or more of the following information: a relative position between the satellite and the terminal device, or a timing drift corresponding to the satellite.

For example, the network device may configure a length of the C-TDW to be a current timing drift derived from a satellite ephemeris. The C-TDW is configured as timing drift, so that the terminal device may update time/frequency pre-compensation frequently enough. A magnitude of the timing drift is largely affected by an elevation angle between the satellite and the terminal device. LEO-1200 km is used as an example. It is assumed that the terminal device is fixed. When the satellite goes away from the terminal device at a 30 degree elevation angle, the timing drift of a round trip delay is about 70.5 μs/s. When the satellite goes away from the terminal device at a 60 degree elevation angle, the timing drift of the round trip delay is 42.59 μs/s. When the elevation angle is about 90 degrees, the timing drift becomes 0.36 μs/s.

estimate a necessary TA pre-compensation update period of the terminal device based on the information, so as to determine the A-TDW.

For an example, for a list of RRC parameters used for PUSCH DMRS bundling of the NTN, one may refer to Table 1. Table 1 is a preliminary list of RRC parameters used for PUSCH DMRS bundling of the NTN (Preliminary list of RRC parameters for PUSCH DMRS bundling for NTN).

TABLE 1

| Parameter | Description | Value range | Per (UE, cell, transmitting and receiving point, . . . ) | UE-specific or cell-specific |
|---|---|---|---|---|
| Phase pre-compensation during PUSCH DMRS Bundling | Indicates that the UE shall pre-compensate for phase rotation of per sub-carrier based on timing drift during PUSCH DMRS bundling | Enumerated {Enabled} | Per UE | UE-specific |

For example, the network device may configure the C-TDW based on a necessary TA pre-compensation update period at the lowest satellite elevation angle in orbit to allow the terminal device to update TA pre-compensation with a sufficient update period, thereby meeting a timing requirement. The network device may update the C-TDW by using RRC reconfiguration according to a satellite location, and adjust the C-TDW based on satellite movement. When the network device does not know a location of the terminal device, the network device is required to estimate the necessary TA pre-compensation update period. For example, the network device may estimate an update period by using a satellite location and a beam direction, and then configure a TDW. The update period may be a fixed value, or may be related to frequent RRC reconfiguration.

For example, the network device configures the C-TDW based on information about a capability reported by the terminal device or assistance information reported by the terminal device. For example, the network device may receive a capability reported by the terminal device that may meet a phase rotation requirement and a maximum quantity of slots of a timing error limit. When reporting the capability of the terminal device based on the maximum quantity of slots, the terminal device may perform pre-compensation to maintain phase rotation within a phase difference limit, and maintain a timing error within the timing error limit. The network device configures a C-TDW size of the terminal device, where the configured TDW size is an upper limit of a maximum quantity of slots reported by the terminal device. Optionally, the C-TDW size (if configured) for PUSCH DMRS bundling is the upper limit of the maximum quantity of slots reported by the terminal device. Optionally, if no C-TDW size for PUSCH DMRS bundling is configured, an A-TDW size is equal to the smallest one of the maximum quantity of slots reported by the terminal device, duration of repetitions of a PUSCH, and a frequency hopping interval during PUSCH DMRS bundling. Optionally, if no C-TDW size for PUSCH DMRS bundling is configured, an A-TDW size is equal to the largest one of the maximum quantity of slots reported by the terminal device, duration of repetitions of a PUSCH, and a frequency hopping interval during PUSCH DMRS bundling.

For example, the A-TDW may be definitely indicated by the network device. For example, the network device may indicate that the A-TDW depends on a desired satellite location and/or beam direction. The network device can For example, the network device may estimate/predict a timing drift based on a UL signal from the terminal device. Further, the network device may configure a C-TDW/A-TDW of the terminal device based on the timing drift, so that the terminal device may pause pre-compensation update within a corresponding TDW, in a case of satisfying a requirement for time/frequency precision.

For example, the C-TDW may be determined based on a relative position between a satellite and the terminal device. The relative position between the satellite and the terminal device may include an elevation angle of the terminal device relative to the satellite. For example, a larger elevation angle between the terminal device and the satellite may be configured with a larger C-TDW. In other words, the C-TDW is positively correlated with the elevation angle. In a specific embodiment, the network device may configure a plurality of C-TDWs based on a variable elevation angle. These C-TDWs may be determined and indicated by the network device in a semi-static manner.

For example, the network device may alternatively configure the C-TDW based on epoch update. In other words, the epoch update of the satellite may also serve as an event for interrupting DMRS bundling.

In some embodiments, when the first time domain window is an A-TDW, the A-TDW may be determined based on a first time interval and a time length of a C-TDW pre-defined/preconfigured by the network device. The DMRS bundling may be DMRS bundling corresponding to the A-TDW. For example, when antenna switching is used, the network device may determine an A-TDW in a C-TDW, or may determine a time length of an A-TDW based on capability report information of the terminal device or assistance information of the terminal device.

When the DMRS bundling and the antenna switching are jointly used, the A-TDW is jointly determined by the C-TDW and the first time interval of the antenna switching, so that a trade-off between a channel estimation gain based on the DMRS bundling and a spatial diversity gain based on the antenna switching may be implemented. In other words, when a size of the A-TDW is determined jointly by the size of the C-TDW and the first time interval for antenna switching, optimal uplink coverage performance of the terminal device may be implemented by means of the trade-off between the channel estimation gain based on the DMRS bundling and the spatial diversity gain based on the antenna switching.

For example, the time length of the A-TDW may be determined by a time length of the C-TDW, a time at which the terminal device completes antenna switching, and the first time interval at which the terminal device performs antenna switching. For example, TA-TDW may meet the following condition:

$$T_{A-TDW} = \min(\alpha \times T_{C-TDW},\ \beta \times (T + M)),$$

where Min ( ) indicates taking a minimum value, $T_{C-TDW}$ indicates a time length of the C-TDW, T indicates a time at which the terminal device completes antenna switching, M indicates the first time interval, and $\alpha$ and $\beta$ are rational numbers of respective adjustment factors. $\alpha$ and $\beta$ may be set by the network device or the terminal device. $\alpha$ and $\beta$ may be the same or different. For example, the terminal device may separately adjust values of $\alpha$ and $\beta$ factors according to a current coverage condition.

In a specific embodiment, the terminal device may report a first time interval M at which the terminal device supports antenna switching. The network device may determine the A-TDW according to the foregoing formula, and instruct the terminal device to select the A-TDW.

In another specific embodiment, the terminal device is required to determine a first time interval M supported by the terminal device, and then determine a selectable A-TDW according to the foregoing formula.

For example, the time length of the A-TDW may be determined by the time length of the C-TDW, a guard period at which the terminal device prepares for antenna switching, and the first time interval at which the terminal device performs antenna switching. $T_{A-TDW}$ may meet the following condition:

$$T_{A-TDW} = \min(\alpha \times T_{C-TDW},\ \beta \times (K + M)),$$

where K indicates a guard period at which the terminal device prepares for antenna switching.

For example, the time length of the A-TDW may be determined by the time length of the C-TDW and the first time interval M at which the terminal device performs antenna switching. $T_{A-TDW}$ may meet the following condition:

$$T_{A-TDW} = \min(\alpha \times T_{C-TDW},\ \beta \times M).$$

In some embodiments, a time length of the first time domain window may be determined based on an event that causes phase discontinuity and power inconsistency. Optionally, if the network device is configured with TACommonDrift and TACommonDrift Variation, common TA may still be updated. When the common TA is updated, it is difficult to control a repetition of transmission for supporting DMRS bundling. To maintain this behavior of the terminal device, update of the common TA is considered as an event. If DMRS bundling is enabled, a time of applying the updated common TA may be indicated or configured with TACommonDrift and TACommonDrift Variation. In addition, the terminal device may calculate terminal device-specific TA based on a location of the terminal device and a higher layer parameter (if configured) related to a service satellite ephemeris. The terminal device may further report the terminal device-specific TA to the network device, and a timing advance report (timing advance report, TAR) requires an uplink-shared channel (uplink-shared channel, UL-SCH) resource. Therefore, application of the terminal device-specific TA shall also be considered as an event. Optionally, if a timer is configured for epoch (epoch) time of a satellite, start/restart of the timer duration indicates that the service satellite ephemeris and a common TA related parameter share a same epoch time. If a validity timer is restarted due to update of epoch time within a TDW, phase continuity and/or power consistency will not be maintained. Therefore, application time of updating the service satellite ephemeris may also be considered as an event. Therefore, events that interrupt phase continuity and/or power consistency include common TA adjustment, update of application time of a satellite ephemeris, application of terminal device-specific TA, and the like. The terminal device or the network device may determine the time length of the first time domain window based on these events. For example, when the first time domain window is a time period transmitted by segments related to DMRS bundling, these events may determine a time length of each segment.

In some embodiments, the first information may include maximum duration during which the terminal device maintains phase continuity. In other words, the time length of the first time domain window may be determined based on the maximum duration during which the terminal device maintains phase continuity. The maximum duration for maintaining phase continuity refers to meeting phase difference limitation, timing and frequency error requirements within the maximum duration. The first time domain window is in no way greater than the maximum duration. Because the maximum duration is related to a capability of the terminal device, the capability of the terminal device may include whether the terminal device uses timing drift pre-compensation in a TDW and a first time interval for performing antenna switching.

For example, in the NTN system, maximum duration of the terminal device may be related to an ephemeris parameter or a location parameter of a satellite. For example, the maximum duration may increase with a decrease in timing drift. For another example, a length of a time window in which the terminal device may maintain phase continuity changes with an elevation angle of the terminal device relative to the satellite.

For example, the maximum duration may be related to a capability of the terminal device to perform TA adjustment and frequency adjustment. For the NTN system, a capability of the terminal device to maintain phase continuity and power consistency depends on independent TA adjustment and frequency adjustment performed by the terminal device. Therefore, for a maximum TDW duration supported by the terminal device, an impact of independent TA adjustment and frequency adjustment performed by the terminal device shall be considered.

For example, the maximum TDW duration supported by the terminal device should be reflected in a UE capability report. In other words, the capability report of the terminal device may indicate the maximum duration supported by the terminal device, namely, the maximum duration during which the terminal device maintains phase continuity.

In some embodiments, the first information may include duration of segment transmission of the uplink channel. In other words, the time length of the first time domain window may be determined based on the duration of segment transmission of the uplink channel. The time length of the first time domain window being determined based on the duration of segment transmission of the uplink channel indicates that the time length of the first time domain window may be determined by a C-TDW that is determined based on the duration of segment transmission of the uplink channel. Repetitions of PUSCH transmission are used as an example. If duration of segment transmission of a PUSCH is configured separately from configuration of DMRS bundling corresponding to the PUSCH, a C-TDW size for PUSCH DMRS bundling is related to the duration of segment transmission of the PUSCH. Because the terminal device does not expect to perform time and frequency update within the duration of segment transmission of the PUSCH, the duration of segment transmission of the PUSCH may serve as an upper limit of the C-TDW size.

For example, the duration of segment transmission of the PUSCH may be determined by the network device based on a current timing drift derived from a satellite ephemeris. The network device may further indicate an updated configuration of the duration of segment transmission of the PUSCH. The update of the duration of segment transmission of the PUSCH is used by the network device to independently reconfigure the C-TDW size. For example, all terminal devices in coverage of the update configuration correspond to a C-TDW size during PUSCH-DMRS bundling.

For example, in a case of DMRS bundling for an uplink channel, duration of segment transmission of the uplink channel may be carried in a system information block (system information block, SIB) and/or dedicated RRC signalling. For example, the duration of segment transmission of the PUSCH is set by the network device, and then may be indicated by a SIB or dedicated RRC signalling. In other words, the duration of segment transmission of the PUSCH may be configured by the network device, and is indicated in slots or other time units by using the SIB or dedicated RRC signalling.

In some embodiments, the first information may further include duration of repetitions of the uplink channel. In other words, the time length of the first time domain window may alternatively be determined based on the duration of repetitions of the uplink channel. The duration of repetitions of the uplink channel may be related to the duration of segment transmission of the uplink channel.

In some embodiments, the time length of the first time domain window may alternatively be determined based on a frequency modulation interval for DMRS bundling.

In some embodiments, when the first time domain window is an A-TDW, the A-TDW may be determined based on the plurality of types of information described above. For example, if a C-TDW size corresponding to the DMRS bundling is not configured, a size of the A-TDW may be equal to a minimum value or a maximum value of some or all of maximum duration reported by the terminal device, an antenna switching interval, duration of segment transmission of the uplink channel, duration of repetitions of the uplink channel, and a frequency hopping interval for DMRS bundling for the uplink channel.

In some embodiments, when the network device is a satellite in the NTN system, the A-TDW may alternatively be determined, like the C-TDW, based on a relative position between the satellite and the terminal device and/or a timing drift corresponding to the satellite. For example, a larger elevation angle between the terminal device and the satellite may be configured with a larger A-TDW. In other words, the A-TDW is positively correlated with the elevation angle. If the C-TDW is configured according to maximum duration, the network device may configure a plurality of A-TDWs based on a variable elevation angle. These A-TDWs may be determined and indicated by the network device in a semi-static manner.

It may be learned that when the time length of the first time domain window is determined based on the first time interval of antenna switching, a DMRS bundling mechanism and an antenna switching mechanism may be jointly executed in transmission of the uplink channel. Further, the time length of the first time domain window is determined jointly by the C-TDW size and the first time interval, and uplink coverage performance of the terminal device may be improved by means of a trade-off between a channel estimation gain based on the DMRS bundling and a spatial diversity gain based on the antenna switching. Further, when the time length of the first time domain window is determined based on the plurality of types of information, the first time domain window corresponding to the DMRS bundling may be more properly determined based on a capability of the terminal device or other related information, so as to ensure a gain of channel estimation.

As mentioned above, the capability of the terminal device includes a capability to perform timing drift pre-compensation in a TDW. Pre-compensation may also be used to eliminate Doppler shift effect. For example, when the terminal device can implement compensation for a local clock of the terminal device, the Doppler shift effect may be eliminated. Specifically, if oscillator frequency is adjusted to offset Doppler shift at the start of a TDW, a time drift is initially zero. Further, an impact on the TDW is increased only when the Doppler shift changes during the TDW, but this has only a very limited effect. For example, for the satellite LEO-1200, a maximum unidirectional Doppler drift rate is 0.09 ppm/s (as shown in Table 6.1.1.1-8 of TS 38.821 [8]). After 20 ms, a maximum Doppler shift of a service link is 2*0.09*0.020 ppm=0.0036 ppm or 7 Hz at 2 GHz carrier frequency, and an impact caused by the shift may be ignored.

In some embodiments, impacts of Doppler shift or timing drift on the A-TDW and the C-TDW may be determined by defining a capability of the terminal device to implement pre-compensation.

For example, some terminal devices may offset the Doppler shift effect at the start of a TDW by pre-compensating local clocks thereof. In the capability report of the terminal device, pre-compensation may be implemented by defining the capability.

For example, some terminal devices may update time and frequency compensation inside a TDW, and a limitation on a length of the TDW caused by update of pre-compensation is required to be avoided when coherent transmission is maintained. The capability may be defined in the capability report of the terminal device to avoid update of pre-compensation.

For example, some terminal devices can only update the time and frequency pre-compensation at a boundary of the TDW. The capability report of the terminal device may indicate pre-compensation by defining the capability.

The foregoing describes the method embodiments of the present application in detail with reference to FIG. 1 to FIG. 6. The apparatus embodiments of the present application are described in detail below with reference to FIG. 7 and FIG. 8. It should be understood that the description of the apparatus embodiments corresponds to the description of the method embodiments. Therefore, for parts that are not described in detail, one may refer to the foregoing method embodiments.

Figure 7:
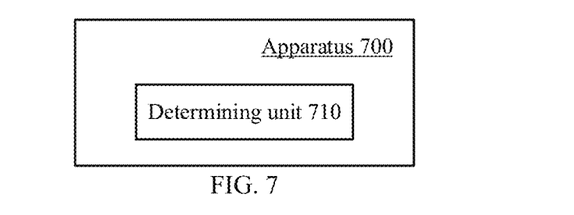
FIG. 7 is a schematic diagram of a structure of an apparatus for wireless communication according to an embodiment of the present application.

FIG. 7 is a schematic block diagram of an apparatus for wireless communication according to an embodiment of the present application. The apparatus 700 may be any terminal device or network device described above. The apparatus 700 shown in FIG. 7 includes a determining unit 710.

The determining unit 710 may be configured to determine a first actual time domain window related to DMRS bundling used for estimation of an uplink channel, where a time length of the first time domain window is determined based on first information, and the first information includes one or more of the following information: a first time interval at which a terminal device performs antenna switching; a time length of a nominal time domain window predefined/preconfigured by a network device; an event that causes phase discontinuity and power inconsistency; maximum duration during which the terminal device maintains phase continuity; duration of repetitions of the uplink channel; or duration of segment transmission of the uplink channel.

Optionally, the network device that receives the uplink channel is a satellite in the NTN system, and a time length of the first time domain window related to the DMRS bundling is alternatively determined based on one or more of the following information: a relative position between the satellite and the terminal device, or a timing drift corresponding to the satellite.

Optionally, the relative position between the satellite and the terminal device includes an elevation angle of the terminal device relative to the satellite, and the time length of the first time domain window related to the DMRS bundling is positively related to the elevation angle.

Optionally, a time length of the first actual time domain window of demodulation reference signal DMRS bundling for estimation of an uplink channel includes: a time length of a first actual time domain window, determined by the network device and received by the terminal device; or a time length of a first actual time domain window determined by the terminal device.

Optionally, the first information includes the time length of the nominal time domain window predefined/preconfigured by the network device, and at least one of the time length of the nominal time domain window or a time length of the first actual time domain window determined by the network device is carried in one or more of the following information: a broadcast message, an RRC message, or DCI.

Optionally, the nominal time domain window is related to a service type corresponding to the uplink channel.

Optionally, the first information includes the first time interval at which the terminal device performs antenna switching. The terminal device currently transmits an uplink channel by using a first antenna, timing of the antenna switching is determined based on signal quality corresponding to the first antenna, and the timing of the antenna switching is related to the first time interval at which the terminal device performs antenna switching.

Optionally, the timing for the antenna switching is further determined based on a first threshold related to the signal quality, and the antenna switching is triggered when the signal quality corresponding to the first antenna is lower than the first threshold.

Optionally, the first information includes the first time interval at which the terminal device performs antenna switching, and a time at which the terminal device completes the antenna switching includes a guard period configured by the terminal device for the antenna switching.

Optionally, the first time domain window is an A-TDW, the first information includes the first time interval at which the terminal device performs antenna switching and the time length of the nominal time domain window predefined/preconfigured by the network device, and a time length $T_{A-TDW}$ of the A-TDW meets the following condition:

$$T_{A-TDW} = \min(\alpha \times T_{C-TDW}, \beta \times (T + M)),$$

where $T_{C-TDW}$ denotes a time length of the nominal time domain window, T denotes a time at which the terminal device completes the antenna switching, M denotes the first time interval, and $\alpha$ and $\beta$ denote adjustment factors.

Optionally, the first time domain window is an A-TDW, the first information includes the first time interval at which the terminal device performs antenna switching and the time length of the nominal time domain window predefined/preconfigured by the network device, and a time length $T_{A-TDW}$ of the A-TDW meets the following condition:

$$T_{A-TDW} = \min(\alpha \times T_{C-TDW}, \beta \times (K + M)),$$

where $T_{C-TDW}$ denotes a time length of the nominal time domain window, K denotes a guard period at which the terminal device prepares for antenna switching, M denotes the first time interval, and $\alpha$ and $\beta$ denote adjustment factors.

Optionally, the first information includes the maximum duration during which the terminal device maintains phase continuity, and the maximum duration is related to a capability of the terminal device to perform TA adjustment and frequency adjustment.

Optionally, the maximum duration during which the terminal device maintains phase continuity is indicated by using a capability report of the terminal device.

Optionally, the first information includes the duration of segment transmission of the uplink channel, and the duration of segment transmission of the uplink channel is carried in a SIB and/or dedicated RRC signalling.

Figure 8:
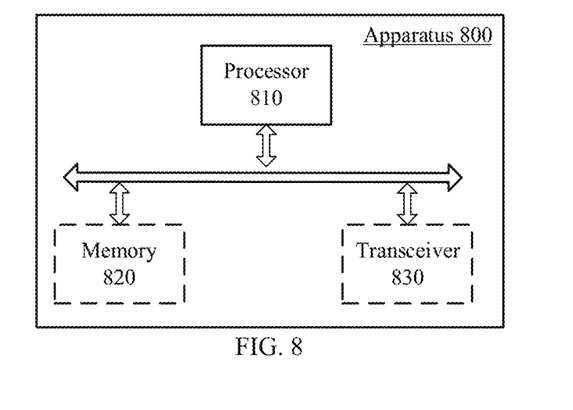
FIG. 8 is a schematic diagram of a structure of a communications apparatus according to an embodiment of the present application.

FIG. 8 is a schematic structural diagram of a communications apparatus according to an embodiment of the present application. The dotted line in FIG. 8 indicates that the unit or module is optional. The apparatus 800 may be configured to implement the method described in the foregoing method embodiments. The apparatus 800 may be a chip, a terminal device, or a network device.

The apparatus 800 may include one or more processors 810. The processor 810 may support the apparatus 800 in implementing the method described in the foregoing method embodiments. The processor 810 may be a general-purpose processor or a dedicated processor. For example, the processor may be a central processing unit (central processing unit, CPU). Alternatively, the processor may be another general-purpose processor, a digital signal processor (digital signal processor, DSP), an application-specific integrated circuit (application specific integrated circuit, ASIC), a field-programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 800 may further include one or more memories 820. The memory 820 stores a program, and the program may be executed by the processor 810, so that the processor 810 executes the method described in the foregoing method embodiments. The memory 820 may be separate from the processor 810 or may be integrated into the processor 810.

The apparatus 800 may further include a transceiver 830. The processor 810 may communicate with another device or chip through the transceiver 830. For example, the processor 810 may transmit data to and receive data from another device or chip through the transceiver 830.

An embodiment of the present application further provides a computer-readable storage medium for storing a program. The computer-readable storage medium may be applied to the terminal device or the network device provided in embodiments of the present application, and the program causes a computer to execute the method executed by the terminal device or the network device in embodiments of the present application.

The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

An embodiment of the present application further provides a computer program product. The computer program product includes a program. The computer program product may be applied to the terminal device or the network device provided in embodiments of the present application, and the program causes a computer to perform the methods to be performed by the terminal or the network device in various embodiments of the present application.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center via a wired (such as a coaxial cable, an optical fiber, and a digital subscriber line (digital subscriber line, DSL)) manner or a wireless (such as infrared, wireless, and microwave) manner.

An embodiment of the present application further provides a computer program. The computer program may be applied to the terminal device or the network device provided in embodiments of the present application, and the computer program causes a computer to perform the methods performed by the terminal device or the network device in various embodiments of the present application.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In embodiments of the present application, the term "corresponding" may mean that there is a direct or indirect correspondence between the two, or may mean that there is an association relationship between the two, which may also be a relationship such as indicating and being indicated, or configuring and being configured.

In embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, predefined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, determining B based on A does not mean determining B based only on A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In the several embodiments provided in the present application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented as indirect couplings or communication connections through some interface, apparatuses or units, and may be implemented in electrical, mechanical, or other forms.

The units described as separate parts may or may not be physically separate, and parts displayed as units may or may not be physical units, and may be located at one position, or may be distributed on a plurality of network elements. Some or all of the units may be selected according to actual requirements to achieve the objectives of the solutions of embodiments.

In addition, functional units in embodiments of the present application may be integrated into one processing unit, each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for wireless communication, comprising:
determining, by a first device in a non terrestrial network (NTN), a time length of a first time domain window of demodulation reference signal (DMRS) bundling used for estimation of an uplink channel, wherein the time length of the first time domain window is determined based on first information, wherein the first information comprises a maximum duration during which a terminal device maintains phase continuity, and the maximum duration is related to a capability of the terminal device to perform timing advance (TA) adjustment and frequency pre-compensation continuously, wherein when antenna switching is performed, the first time domain window of DMRS bundling is an actual time domain window (A-TDW) that is determined based on a first time interval at which the terminal device performs the antenna switching.

2. The method according to claim 1, wherein the first information further comprises one or more of following information:
a first time interval at which a terminal device performs antenna switching;
a time length of a nominal time domain window;
an event that causes phase discontinuity and power inconsistency;
duration of repetitions of the uplink channel; or
duration of segment transmission of the uplink channel.

3. The method according to claim 1, wherein the first device is a satellite in the NTN, and the time length of the first time domain window of the DMRS bundling is further determined based on one or more of following information:
a relative position between the satellite and a terminal device; or
a timing drift corresponding to the satellite.

4. The method according to claim 3, wherein the relative position between the satellite and the terminal device comprises an elevation angle of the terminal device relative to the satellite, and the time length of the first time domain window of the DMRS bundling is positively related to the elevation angle.

5. The method according to claim 1, wherein the time length of the first time domain window comprises:

a time length of a first time domain window determined by a network device; or
a time length of a first time domain window determined by the terminal device.

6. The method according to claim 1, wherein the first information comprises a time length of a nominal time domain window, and at least one of the time length of the nominal time domain window or the time length of the first time domain window is carried in one or more of following information: a broadcast message, a radio resource control (RRC) message, or downlink control information (DCI).

7. The method according to claim 6, wherein the nominal time domain window is related to a service type corresponding to the uplink channel.

8. The method according to claim 1, wherein the first information further comprises a first time interval at which the terminal device performs antenna switching, the terminal device currently transmits the uplink channel by using a first antenna, timing of the antenna switching is determined based on signal quality corresponding to the first antenna, and the timing of the antenna switching is related to the first time interval at which the terminal device performs antenna switching.

9. The method according to claim 8, wherein the timing for the antenna switching is further determined based on a first threshold related to a signal quality, and the antenna switching is triggered when the signal quality corresponding to the first antenna is lower than the first threshold.

10. The method according to claim 1, wherein the first information further comprises a first time interval at which the terminal device performs antenna switching, and a time at which the terminal device completes the antenna switching comprises a guard period configured by the terminal device for the antenna switching.

11. The method according to claim 1, wherein a time length TA-TDW of the A-TDW meets following condition:

$$T_{A-TDW} = \min(\alpha \times T_{C-TDW}, \beta \times (T + M)),$$

wherein $T_{C-TDW}$ denotes a time length of a nominal time domain window, T denotes a time at which the terminal device completes the antenna switching, M denotes the first time interval, and $\alpha$ and $\beta$ denote adjustment factors.

12. The method according to claim 1, wherein a time length $T_{A-TDW}$ of the A-TDW meets following condition:

$$T_{A-TDW} = \min(\alpha \times T_{C-TDW}, \beta \times (K + M)),$$

wherein $T_{C-TDW}$ denotes a time length of a nominal time domain window, K denotes a guard period at which the terminal device prepares for antenna switching, M denotes the first time interval, and $\alpha$ and $\beta$ denote adjustment factors.

13. The method according to claim 1, wherein the maximum duration during which the terminal device maintains phase continuity is indicated by using a capability report of the terminal device.

14. The method according to claim 1, wherein the first information further comprises a duration of segment transmission of the uplink channel, and the duration of segment transmission of the uplink channel is carried in at least one of a system information block (SIB) or dedicated RRC signalling.

15. The method according to claim 1, wherein the first device is a network device.

16. The method according to claim 1, wherein the first device is the terminal device.

17. A first device, comprising:
   at least one processor; and
   one or more non-transitory computer-readable storage media coupled to the at least one processor and storing programming instructions for execution by the at least one processor, wherein the programming instructions, when executed, cause the first device to perform operations comprising:
   determining a time length of a first time domain window of demodulation reference signal (DMRS) bundling used for estimation of an uplink channel, wherein the time length of the first time domain window is determined based on first information, wherein the first information comprises a maximum duration during which a terminal device maintains phase continuity, and the maximum duration is related to a capability of the terminal device to perform timing advance (TA) adjustment and frequency pre-compensation continuously, wherein when antenna switching is performed, the first time domain window of DMRS bundling is an actual time domain window (A-TDW) that is determined based on a first time interval at which the terminal device performs the antenna switching.

18. The first device according to claim 17, wherein the first device is a network device.

19. The first device according to claim 17, wherein the first information further comprises one or more of following information:

a first time interval at which a terminal device performs antenna switching;

a time length of a nominal time domain window;

an event that causes phase discontinuity and power inconsistency;

duration of repetitions of the uplink channel; or duration of segment transmission of the uplink channel.

20. A second device, comprising:
   at least one processor; and
   one or more non-transitory computer-readable storage media coupled to the at least one processor and storing programming instructions for execution by the at least one processor, wherein the programming instructions, when executed, cause the second device to perform operations comprising:
   receiving second information from a first device in a non terrestrial network (NTN), wherein second information comprises a time length of a first time domain window of demodulation reference signal (DMRS) bundling used for estimation of an uplink channel, wherein the time length of the first time domain window is determined based on first information, wherein the first information comprises a maximum duration during which a terminal device maintains phase continuity, and the maximum duration is related to a capability of the terminal device to perform timing advance (TA) adjustment and frequency pre-compensation continuously, wherein when antenna switching is performed, the first time domain window of DMRS bundling is an actual time domain window (A-TDW) that is determined based on a first time interval at which the terminal device performs the antenna switching.

* * * * *